(12) United States Patent
Iny

(10) Patent No.: US 7,088,731 B2
(45) Date of Patent: Aug. 8, 2006

(54) MEMORY MANAGEMENT FOR PACKET SWITCHING DEVICE

(75) Inventor: Ofer Iny, Woodland Hills, CA (US)

(73) Assignee: Dune Networks, Agoura, CA (US)

( * ) Notice: Subject to any disclaimer, the term of this patent is extended or adjusted under 35 U.S.C. 154(b) by 770 days.

(21) Appl. No.: 09/872,289

(22) Filed: Jun. 1, 2001

(65) Prior Publication Data

US 2002/0181481 A1   Dec. 5, 2002

(51) Int. Cl.
*H04L 12/28* (2006.01)
(52) U.S. Cl. .................. 370/413; 370/415; 370/468
(58) Field of Classification Search .............. None
See application file for complete search history.

(56) References Cited

U.S. PATENT DOCUMENTS

| | | | | |
|---|---|---|---|---|
| 4,602,341 A | * | 7/1986 | Gordon et al. | 700/286 |
| 5,379,297 A | | 1/1995 | Glover | 370/60.1 |
| 5,408,469 A | | 4/1995 | Opher | 370/60.1 |
| 5,537,562 A | * | 7/1996 | Gallup et al. | 712/234 |
| 5,650,993 A | * | 7/1997 | Lakshman et al. | 370/236 |
| 5,689,501 A | | 11/1997 | Takase | 370/244 |
| 5,724,358 A | * | 3/1998 | Headrick et al. | 370/418 |
| 5,781,547 A | | 7/1998 | Wilson | 370/395 |
| 5,809,021 A | | 9/1998 | Diaz | 370/364 |
| 5,954,794 A | * | 9/1999 | Fishler et al. | 709/213 |
| 6,009,108 A | | 12/1999 | Takehara | 370/538 |
| 6,031,843 A | | 2/2000 | Swanbery | 370/426 |
| 6,035,348 A | * | 3/2000 | Webber et al. | 710/54 |
| 6,046,979 A | | 4/2000 | Bauman | 370/229 |
| 6,052,368 A | | 4/2000 | Aybay | 370/357 |
| 6,072,772 A | | 6/2000 | Charny | 370/229 |
| 6,134,217 A | | 10/2000 | Stiliades | 370/232 |
| 6,205,145 B1 | | 3/2001 | Yamazaki | 370/395 |
| 6,216,167 B1 | | 4/2001 | Momirov | 709/238 |
| 6,813,249 B1 | * | 11/2004 | Lauffenburger et al. | 370/253 |

\* cited by examiner

*Primary Examiner*—Chau Nguyen
*Assistant Examiner*—Cynthia Davis
(74) *Attorney, Agent, or Firm*—Pearl Cohen Zedek Latzer, LLP

(57) ABSTRACT

A method and system for managing memory in a packet switching device is disclosed. The method and system comprises managing the memory as a single FIFO when inserting packets and managing the memory as a plurality of FIFO queues when removing packets. A memory management scheme in accordance with the present invention takes advantage of the nature of packet switching to give an efficient implementation of multiple independent queues in a memory. The key observation that is made is that in a packet switch it is expected that packets may be stored in the memory for a time no greater than the time it takes to fill up the memory. If a packet due to extreme congestion is delayed longer than that, then deleting that packet is an acceptable result.

32 Claims, 5 Drawing Sheets

200

MEMORY MANAGEMENT FOR PACKET SWITCHING DEVICE

FIELD OF THE INVENTION

The present invention relates generally to packet switching devices and more particularly to memory management for packet switching devices.

BACKGROUND OF THE INVENTION

Multi-port packet switching devices by their nature require memory to temporarily buffer packets before transmission to their destination. Typically in a packet switching device a plurality of queues is required. At the minimum one queue per output port is required. Packet switching devices employ either an input, input output, output, or shared memory architectures or a combination of these. In most cases a bulk memory needs to be managed as a plurality of independent queues. A switching device may have a plurality of such memories. It is desirable to be able to manage such memory in the most efficient way as to facilitate a large number of queues and fast access with the minimum of resources. The present invention addresses such a need.

SUMMARY OF THE INVENTION

A method and system for managing memory in a packet switching device is disclosed. The method and system comprises managing the memory as a single FIFO when inserting packets and managing the memory as a plurality of FIFO queues when removing packets.

A memory management scheme in accordance with the present invention takes advantage of the nature of packet switching to give an efficient implementation of multiple independent queues in a memory. The key observation that is made is that in a packet switch it is expected that packets may be stored in the memory for a time no greater than the time it takes to fill up the memory. If a packet is delayed due to extreme congestion then deleting that packet is an acceptable result.

BRIEF DESCRIPTION OF THE DRAWINGS

FIG. 4 is a depiction of the memory after 4 packets have been written in.

DETAILED DESCRIPTION

The present invention relates generally to packet switching devices and more particularly to memory management for the packet switching device. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A system in accordance with the present invention utilizes a global input FIFO which manages the memory as a single FIFO when packets are inserted thereto and manages the memory as a plurality of FIFO queues when removing packets. To describe the global input FIFO, a memory manager maintains a Global FIFO Write Pointer (GFWP), and a Global FIFO Delete Pointer (GFDP). To describe the plurality of queues, the memory manager maintains Queue Tail Pointers, Queue Head Pointers, and Queue Link Pointers. Optionally the memory manager may maintain a Queue Size and/or a queue empty flag.

A packet's data is written into the memory sequentially starting at the GFWP. As the packet's data is written the GFWP advances. The packets in the memory are stored in a chronological sequential order starting from above the GFDP (oldest) to just below the GFWP (newest). In this way, the start address and the length of the packets in memory words describe a packet.

The memory manager constructs a database describing the global FIFOs memory's content as a plurality of queues using the queue tail pointers, queue head pointers, and queue link pointers. The GFDP precedes the GFWP by a preset value.

The GFDP advances when a packet's data is written into the memory to maintain the separation. If the GFDP points to an active start of packet (SOP) then a packet is scheduled to be removed from the queue to which that packet belongs. In this way if a packet remains in the switching device's memory longer then it takes to fill up the global FIFO then it is deleted from the memory. This resolves the single FIFO and multiple FIFO queues representation of the memory. The memory between the GFDP and the GFWP, called the empty zone, may not contain packets that belong to a queue.

The main advantages of this method are: no free memory management, packets are written in a sequential order and memory is efficiently used, packets are deleted if they stay in the memory longer then it takes to fill it up, it is conducive to queuing systems with a large number of queues in a limited amount of memory.

To describe the features of the present invention in more detail, refer now to the following discussion in conjunction with the accompanying figures.

Figure 1:
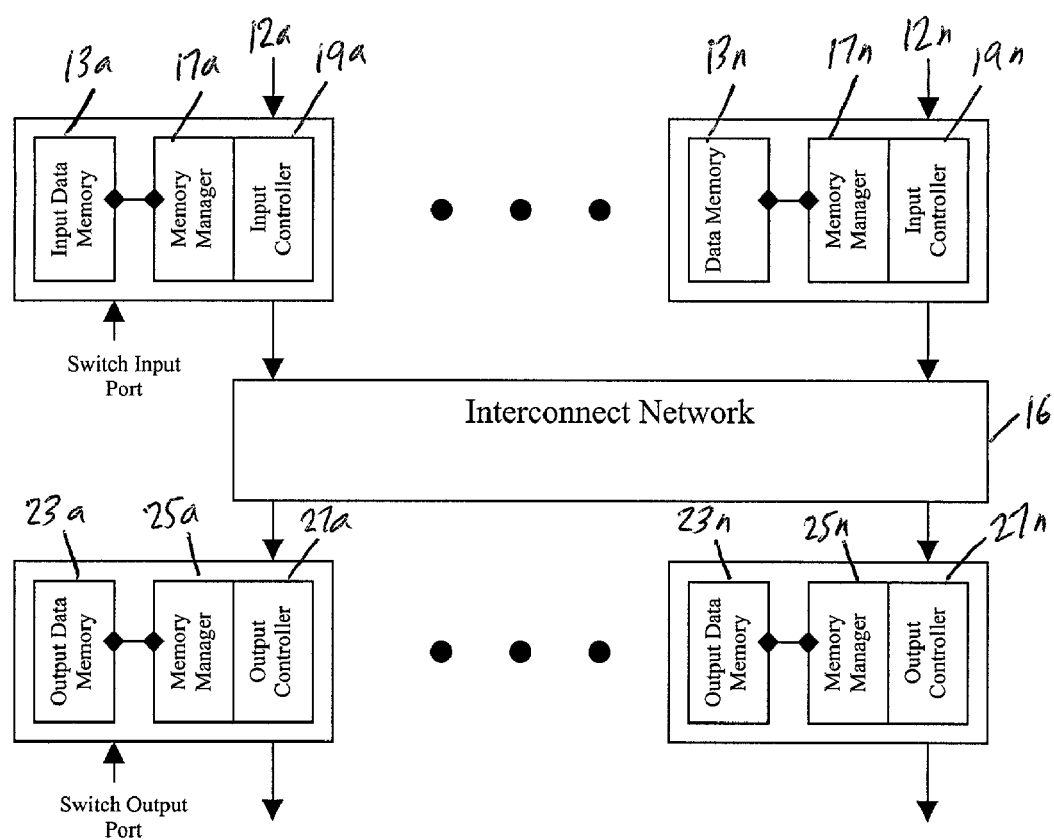
FIG. 1 illustrates a block diagram of a high performance switch block.

FIG. 1 illustrates a block diagram of a high performance switch block 10. Typical high performance switches require input and output packet queues. The switch block 10 includes a plurality of ingress controllers 12a–12n and a plurality of egress controllers 14a–14n. Each of the ingress controllers and egress controllers are coupled to an interconnect network 16. Each of the ingress controllers 12a–12n includes an input data memory 13, a memory manager 17 and an input controller 19. Each of the egress controllers 14a–14n includes an output data memory 23, a memory manager 25 and an output controller 27. Variable sized packets are stored in the input memory of the ingress controller 12a–12n. The input memory is organized as a plurality of FIFO queues. Typically there is at least one queue per output port and priority at the input. Packets are switched to the output port 14a–14n through the interconnect network 16. Packets are stored at the output port prior to transmission. Typically there are a plurality of FIFO queues at the output per input port and per priority.

Figure 2:
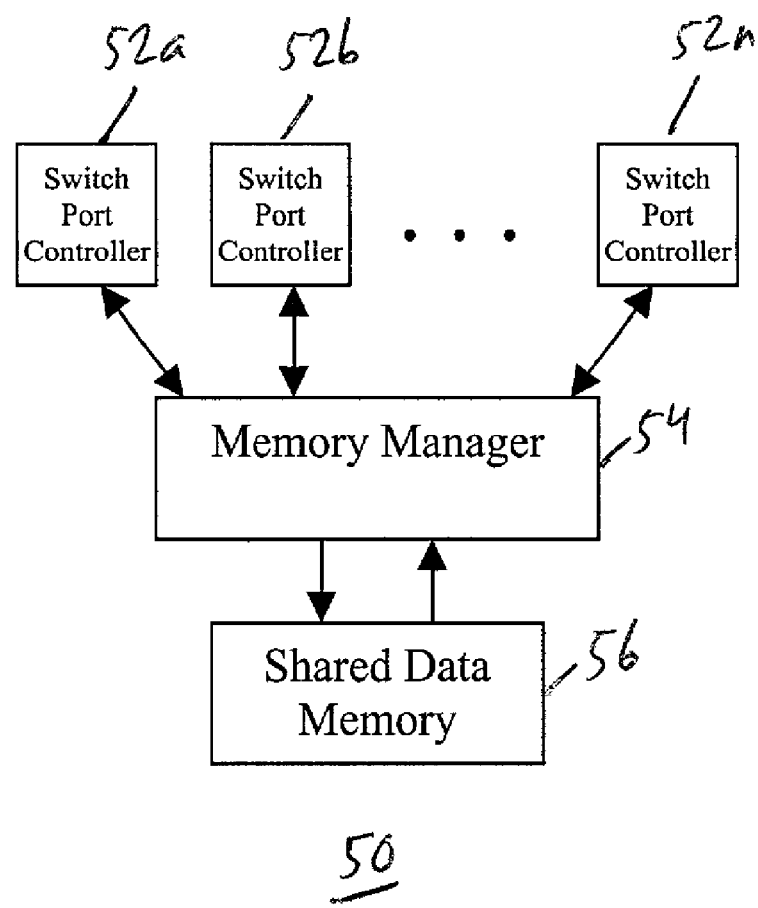
FIG. 2 illustrates a block diagram of a shared memory switch block.

FIG. 2 illustrates a block diagram of a shared memory switch block 50. The switch block 50 comprises a plurality of switch port controllers 52*a*–52*n* which communicate with memory manager 54. The memory manager 54 in turn is in communication with a shared data memory 56. In this system, the memory is managed as a plurality of FIFO queues. Typically there is a plurality of queues per input-output pair and per priority. The memory manager 54 maintains a description of the memory as a plurality of FIFO queues accessible by the switch port controllers 52*a*–52*h*.

Figure 3:
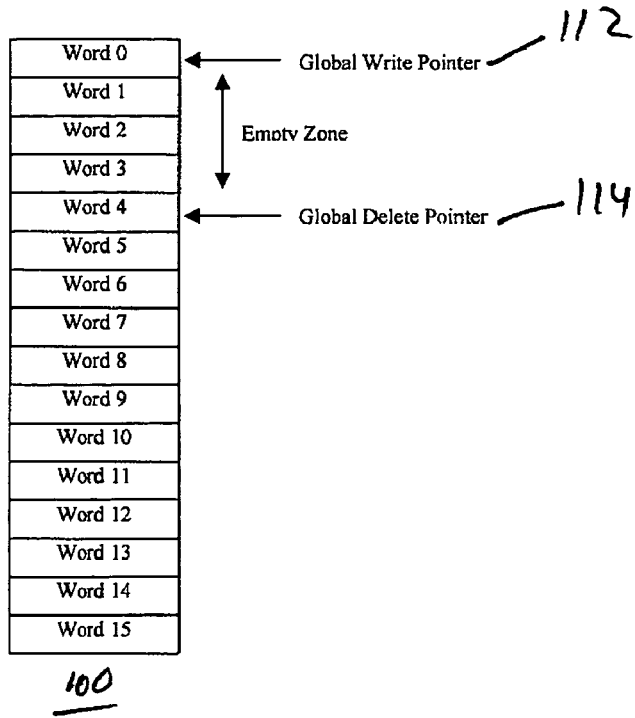
FIG. 3 is a depiction of a memory after initialization.

FIG. 3 is a depiction of a memory which is managed by a memory manager after initialization. Referring to FIG. 1, a sample memory 100 is shown with 16 words (Of course normal memories will have many more words). After initialization the global FIFO write pointer 112 is initialized to point to word 0 and the global FIFO delete pointer 114 is initialized to point to word 4. At this time there are no packets in the memory.

Figure 4:
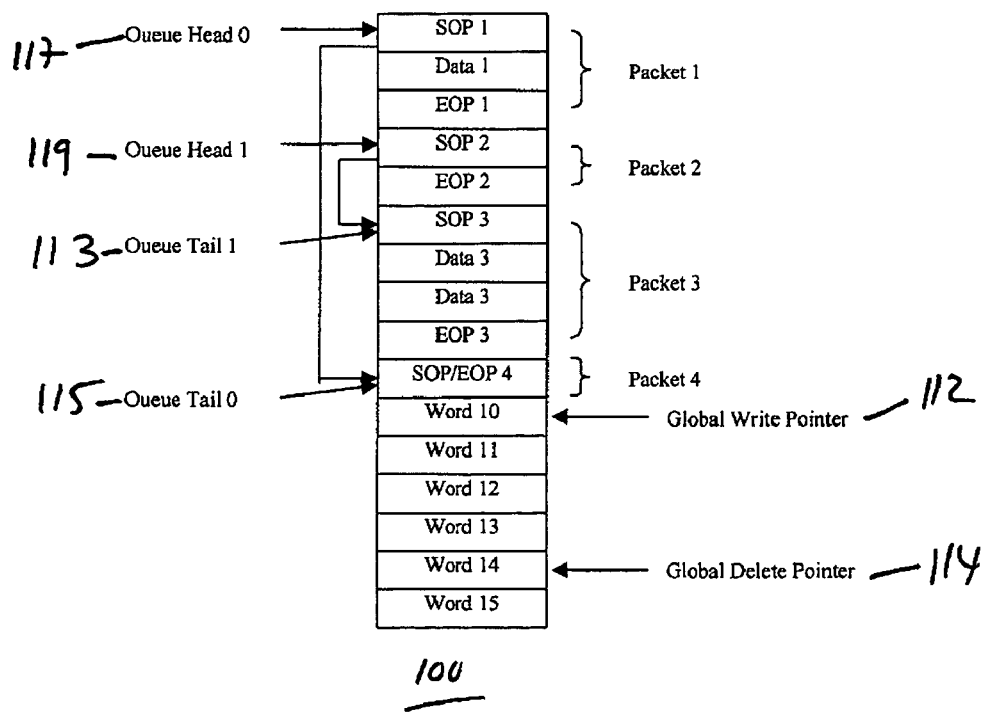

FIG. 4 is a depiction of the memory 100 after 4 packets have been written in. The first packet is 3 memory words long. The start of packet (SOP) is written into word 1 of the memory and the end of packet (EOP) is written into word 3. Packets 2,3,4 are of size 2,4,1 respectively. After writing all the packets the GFWP is pointing to word 10 and the GFDP is pointing to word 14.

There are two active (non-empty) queues. Packets 1,4 are in queue 0 and packets 2,3 are in queue 1. Queue 0 is defined by; the Queue Head Pointer 0, which is pointing to word 0 where the SOP of packet 1 is, Queue Tail Pointer 0, which is pointing to word 9 where the SOP of the last packet in the queue is, and a link pointer, which points from packet 1 SOP to packet 4 SOP. Similarly, queue 1 is defined by: Queue Head Pointer 1, Queue Tail Pointer 1, and a Link Pointer.

Figure 5:
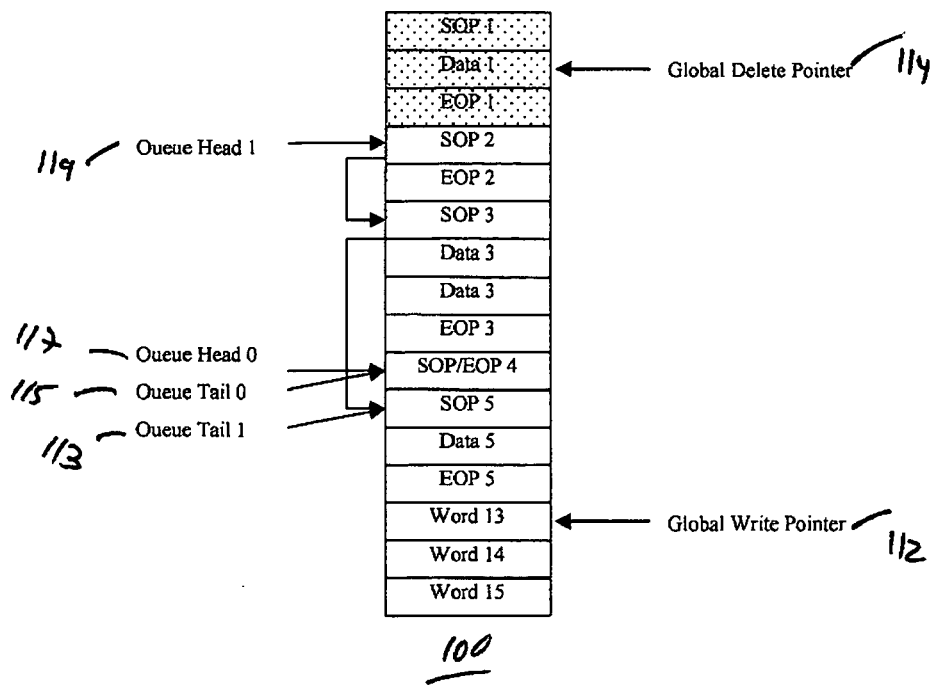
FIG. 5 is a depiction of the memory after 5 packets have been written and the first packet deleted.

FIG. 5 is a depiction of the memory after 5 packets have been written and the first packet deleted. Referring to FIG. 5, packet number 5 is added to the memory. As a result the GFWP is incremented to word 13 and the GFDP to word 1. As the GFDP is incremented it goes through word 0. When it points to word 0 we see that there is an active packet SOP that belongs to queue 0 (the mechanism to make this determination is explored further below). The memory manager then forces a packet to be removed from queue 0. As a result, in this case, that same packet was removed from the memory. In a switching device this results in the discard of a packet. As a result, queue 0 head pointer 117 was reset to the link pointer's value.

Figure 6:
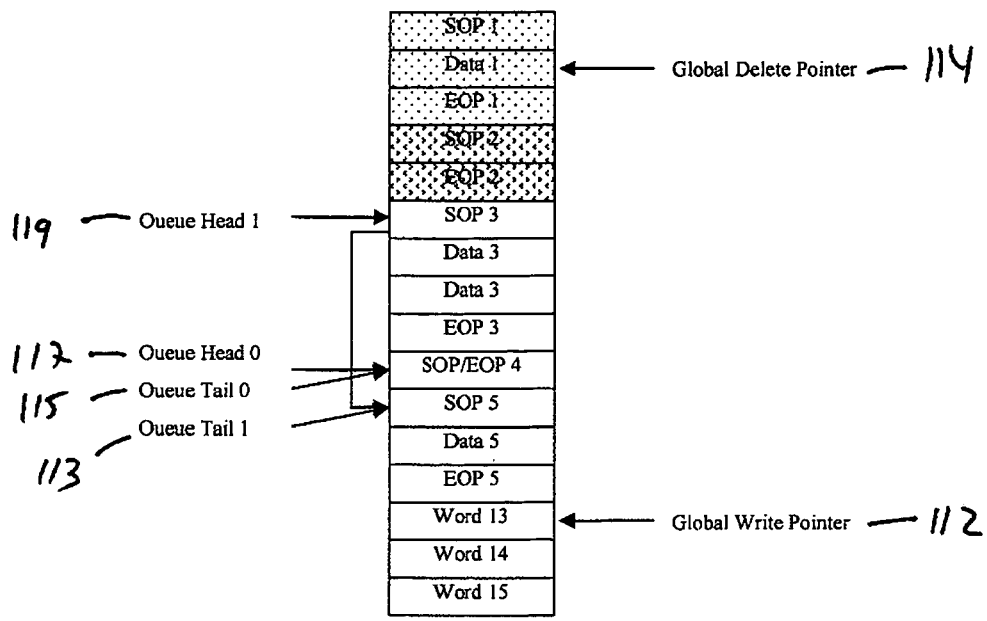
FIG. 6 is a depiction of the memory after the second packet was removed.

FIG. 6 is a depiction of the memory 100 after the second packet was removed. Referring to FIG. 6, packet number 2 was removed from queue 1. In a switching device this may have happened due to the transmission of the packet or an "intelligent" discard. As a result, queue 1 head pointer 119 was reset to the link pointer's value.

Figure 7:
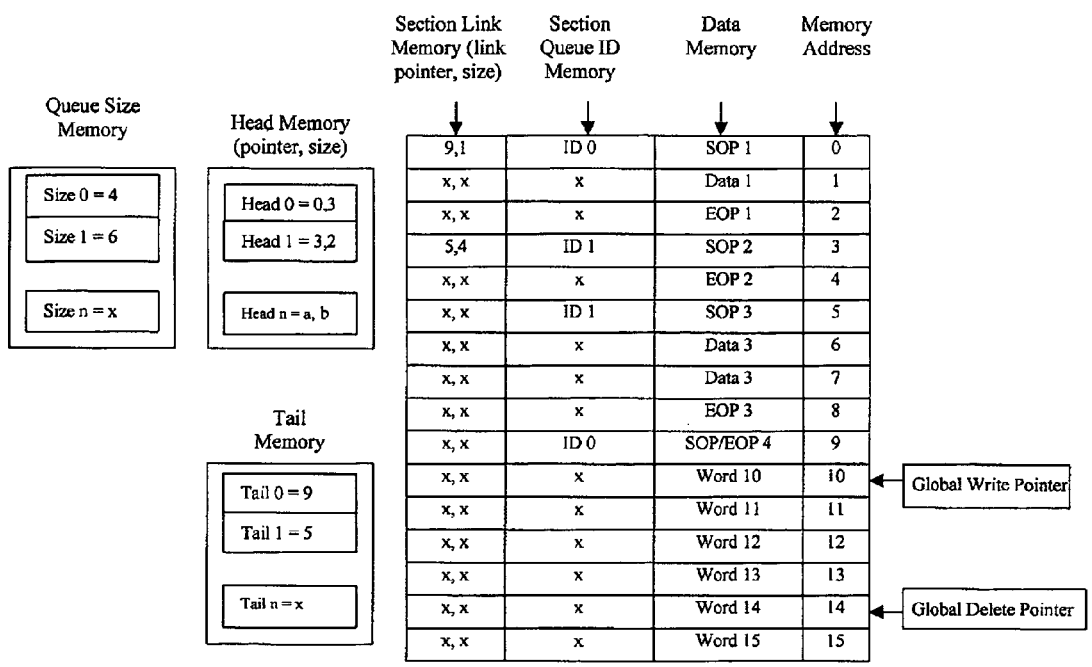
FIG. 7 is a diagram of the memory manager component.

FIG. 7 is a diagram of the memory manager component 200. Referring to FIG. 5, one implementation of the memory management, with values shown corresponding to memory configuration in FIG. 2, has separately addressable; data memory, section queue ID memory, section link memory, queue head pointers memory, queue tail section pointers memory, and queue size memory. A section is defined as a block of memory that can have at most one start of packet word (SOPW). In the example shown it is assume that each data memory word may contain an SOPW.

The data memory contains packet data words. The section queue ID memory contains a flag indicating if an SOPW exist in the corresponding data section and if so the queue ID to which the SOPW belongs. The section link memory contains the link pointers to the next SOPW of the next packet in the queue and that packet's size. The queue head memory contains the pointers to the queue's last packet's SOPW and that packet's size. The queue tail section pointers memory contains a pointer to the section of the tail (youngest) packet's SOPW of the queue.

A way of determining when the GFDP points to an active packet is by maintaining a corresponding word per memory section that contains the queue ID to which a possible SOPW belongs and possibly also a flag indicating if the section has an SOPW. When a packet start word is written, the corresponding section queue ID memory is written with the queue ID to which the packet belongs and possibly the SOP flag is set. If an SOP flag is maintained then, when a section is written without an SOPW the SOP flag is cleared. When the GFDP advances to a new section, this section queue ID is read. Then if the queue is not empty the head pointer of that queue is compared to the GFDP. If the two are equal then the packet is removed from that queue. Possibly, if an SOP flag is implemented then if the queue is not empty and the SOP flag is set and the queue head pointer is equal to the GFDP or is between the GFWP and GFDP (empty zone) a packet remove operation for the queue is scheduled.

A system in accordance with the present invention utilizes a global input FIFO which manages the memory as a single FIFO when packets are inserted thereto and manages the memory as a plurality of FIFO queues when removing packets. A memory management scheme in accordance with the present invention takes advantage of the nature of packet switching to give an efficient implementation of multiple independent queues in a memory. The key observation that is made is that in a packet switch it is expected that packets may be stored in the memory for a time no greater than the time it takes to fill up the memory. If a packet is delayed due to extreme congestion, then deleting that packet is an acceptable result.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method of managing a plurality of queues of received packets, the method comprising:

sequentially inserting said packets into a circular first-in-first-out memory scheme; and selectively associating said packets with said plurality of queues by updating queue information that links between a packet being inserted into said memory scheme and a previous packet associated with the same queue as the packet being inserted.

2. The method of claim 1 further comprising removing said packets from said memory scheme according to said plurality of queues.

3. The method of claim 1, wherein said plurality of queues comprises a plurality of independent first-in-first-out queues.

4. The method of claim 1, wherein sequentially inserting said packets comprises:

inserting a start of a packet at a memory word indicated by a write pointer; and advancing said write pointer to indicate a memory word located after a memory word containing an end of said packet.

5. The method of claim 4, wherein sequentially inserting said packets comprises advancing a delete pointer jointly with said write pointer such that an empty zone of a predetermined length is maintained between said write pointer and said delete pointer.

6. The method of claim 5 further comprising dropping an indicated packet corresponding to a memory word indicated by said delete pointer, if said indicated packet is linked to one of said plurality of queues.

7. The method of claim 6 further comprising determining if said indicated packet is linked to one of said plurality of queues by comparing a location of the memory word indicated by said delete pointer to a location indicated by a head pointer of a queue associated with said memory word.

8. The method of claim 6 further comprising determining a queue associated with said memory word based on information associating between a plurality of memory words and said plurality of queues.

9. The method of claim 1, wherein updating said queue information comprises updating a linking pointer associated with said previous packet to identify a location of the packet being inserted.

10. The method of claim 1 further comprising identifying said previous packet based on a tail pointer corresponding to the queue associated with the packet being inserted.

11. The method of claim 1 further comprising managing a plurality of header pointers identifying the beginning of said plurality of queues, respectively.

12. The method of claim 1 further comprising updating one or more values corresponding to at least one of a header pointer of a queue, a tail pointer of said queue, and a link pointer linking between two consecutive packets of said queue.

13. The method of claim 1, wherein a capacity of said memory scheme is predetermined based on an expected rate for receiving said packets into said memory scheme.

14. A system for managing a plurality of queues of received packets, the system comprising:
   a circular first-in-first-out memory scheme to sequentially store said packets; and
   a memory manager able to associate said packets with said plurality of queues by updating queue information that links between a packet being inserted into said memory scheme and a previous packet associated with the same queue as the packet being inserted.

15. The system of claim 14, wherein said memory manager is able to remove said packets from said memory scheme according to said plurality of queues.

16. The system of claim 14, wherein said plurality of queues comprises a plurality of first-in-first-out queues.

17. The system of claim 14, wherein said memory scheme comprises a write pointer to indicate a memory word for inserting a word of a received packet.

18. The system of claim 17, wherein said memory scheme comprises a delete pointer to be advanced jointly with said write pointer such that an empty zone of a predetermined length is maintained between said write pointer and said delete pointer.

19. The system of claim 18, wherein said memory manager is able to drop an indicated packet corresponding to a memory word indicated by said delete pointer, if said indicated packet is linked to one of said plurality of queues.

20. The system of claim 19, wherein said memory manager is able to determine if said indicated packet is linked to one of said plurality of queues by comparing a location of the memory word indicated by said delete pointer to a location indicated by a head pointer of a queue associated with said memory word.

21. The system of claim 19, wherein said memory manager is able to determine a queue associated with said memory word based on information associating between a plurality of memory words and said plurality of queues.

22. The system of claim 14, wherein said memory manager is able to update a linking pointer associated with said previous packet to identify a location of the packet being inserted.

23. The system of claim 14, wherein said memory manager is able to manage a plurality of header pointers identifying the beginning of said plurality of queues, respectively.

24. The system of claim 14, wherein said memory manager is able to identify said previous packet based on a tail pointer corresponding to the queue associated with the packet being inserted.

25. The system of claim 14, wherein said memory manager is able to maintain one or more values corresponding to at least one of a header pointer of a queue, a tail pointer of said queue, and a link pointer linking between two consecutive packets of said queue.

26. The system of claim 14, wherein a capacity of said memory scheme is predetermined based on an expected rate for receiving said packets into said memory scheme.

27. The method of claim 2, wherein said removing comprises removing a packet identified by a header pointer of a queue, and updating said header pointer to identify a successive packet which is linked to the packet being removed.

28. The method of claim 6, wherein dropping said indicated packet comprises updating a header pointer of a queue associated with said indicated packet to identify a successive packet, which is linked to said indicated packet.

29. The method of claim 6, wherein dropping said indicated packet comprises dropping an oldest packet stored in said memory.

30. The system of claim 15, wherein said memory manager is able to remove a packet identified by a header pointer of a queue, and update said header pointer to identify a successive packet which is linked to the packet being removed.

31. The system of claim 19, wherein said memory manager is able to update a header pointer of a queue associated with said indicated packet to identify a successive packet, which is linked to said indicated packet.

32. The system of claim 19, wherein said indicated packet comprises an oldest packet stored in said memory.

* * * * *